(12) United States Patent
Yi et al.

(10) Patent No.: US 7,099,122 B2
(45) Date of Patent: Aug. 29, 2006

(54) SPIN POLARIZATION ENHANCEMENT ARTIFICIAL MAGNET

(75) Inventors: Ge Yi, Culmore (IE); Robert W. Lamberton, Limavady (IE); Susan Jane Tara Murdoch, Londonderry (IE); Thomas K. McLaughlin, Londonderry (IE); William J. O'Kane, Limavady (IE)

(73) Assignee: Seagate Technology LLC, Scotts Valley, CA (US)

( * ) Notice: Subject to any disclaimer, the term of this patent is extended or adjusted under 35 U.S.C. 154(b) by 363 days.

(21) Appl. No.: 10/737,579

(22) Filed: Dec. 16, 2003

(65) Prior Publication Data

US 2005/0128651 A1    Jun. 16, 2005

(51) Int. Cl.
    G11B 5/39    (2006.01)
(52) U.S. Cl. .................................. 360/324.1; 360/324.2
(58) Field of Classification Search ............... None
    See application file for complete search history.

(56) References Cited

U.S. PATENT DOCUMENTS

| | | | |
|---|---|---|---|
| 5,654,566 A | 8/1997 | Johnson | |
| 5,764,567 A | 6/1998 | Parkin | |
| 5,801,984 A | 9/1998 | Parkin | |
| 6,081,115 A | 6/2000 | Mukasa et al. | |
| 6,396,669 B1* | 5/2002 | Gill | 360/319 |
| 6,421,212 B1 | 7/2002 | Gibbons et al. | |
| 6,445,554 B1 | 9/2002 | Dong et al. | |
| 6,538,856 B1* | 3/2003 | Gill | 360/319 |
| 6,580,588 B1* | 6/2003 | Gill | 360/324.1 |
| 6,600,314 B1 | 7/2003 | Kou | |
| 6,683,762 B1* | 1/2004 | Li et al. | 360/324.11 |
| 6,953,601 B1* | 10/2005 | Li et al. | 427/131 |
| 2002/0036876 A1 | 3/2002 | Kawawake et al. | |
| 2002/0051897 A1 | 5/2002 | Saito et al. | |
| 2002/0097538 A1 | 7/2002 | Seyama et al. | |
| 2003/0011463 A1 | 1/2003 | Iwasaki et al. | |
| 2003/0030945 A1 | 2/2003 | Heinonen et al. | |
| 2003/0072111 A1 | 4/2003 | Hasegawa et al. | |
| 2003/0103299 A1 | 6/2003 | Saito | |
| 2004/0109350 A1* | 6/2004 | Epstein | 365/158 |
| 2004/0178460 A1* | 9/2004 | Lee et al. | 257/421 |
| 2005/0111145 A1* | 5/2005 | Yuasa et al. | 360/324.2 |
| 2005/0280953 A1* | 12/2005 | Hasegawa et al. | 360/324.1 |

OTHER PUBLICATIONS

M. D. Stiles and D. R. Penn, Calculation of spin-dependent interface resistance, Feb. 1, 2000, pp. 3200-3202, vol. 61, No. 5.
E. C. Anderson and M. B. Stearns, Magnetic behavior and morphology of evaporated Fe/Mo multilayered thin films (abstract), Journal of Applied Physics, May 15, 1993, vol. 73 I. 10, p. 5985.

(Continued)

*Primary Examiner*—Jefferson Evans
(74) *Attorney, Agent, or Firm*—Kinney & Lange, P.A.

(57) ABSTRACT

A spin polarization enhancement artificial (SPEA) magnet comprises combinations of positive spin asymmetry interfaces and inverse spin asymmetry interfaces arranged antiferromagnetically such that current passed through the SPEA magnet has enhanced spin polarization. The SPEA magnet additionally may combine bulk material properties of electron scattering to either supplement or replace the interfacial spin differentiation. A basic functional unit of the SPEA magnet includes two ferromagnetic layers separated by two spacer layers. Each spacer forms an interface such that adjacent ferromagnetic layers produce different spin symmetry. Antiferromagnetic arrangement of adjacent ferromagnetic layers coordinates the different spin symmetries such that a single spin state is selected and also provides additional stabilization to the SPEA magnet.

40 Claims, 10 Drawing Sheets

OTHER PUBLICATIONS

J.-P. Renard, P. Bruno, R. Megy, B. Bartenlian, P. Beauvillain, C. Chappert, C. Dupas, E. Kolb, M. Mulloy, J. Prieur, P. Veillet, and E. Velu, Inverse giant magnetoresistance (invited) Journal of Applied Physics 79, Apr. 15, 1996, pp. 5270-5275.

C. Vouille, A. Fert, and A. Barthelemy, S. Y. Hsu, R. Loloee, and P. A. Schroeder, Inverse CPP-GMR in (A/Cu/Co/Cu) multilayers (A=NiCr, FeCr, FeV) and discussion of the spin asymmetry induced by impurities, Journal of Applied Physics 81, Apr. 15, 1997, pp. 4573-4575.

W. Park, R. Loloee, J. A. Caballero, W. P.Pratt, Jr., P. A. Schroeder, and J. Bass, A. Fert and C. Vouille; Test of unified picture of spin-dependent transport in perpendicular (CPP) giant magnetoresistance and bulk alloys, Journal of Applied Physics, vol. 85, Apr. 15, pp. 4542-4544.

C. Vouille, A. Barthelemy, F. Elokan Mpondo, and A. Fert, P. A. Schroeder, S. Y. Hsu, A. Reilly, and R. Loloee, Microscopic mechanisms of giant magnetoresistance, Physical Review B, vol. 60, Sep. 1, 1999, pp. 6710-6722.

* cited by examiner

SPIN POLARIZATION ENHANCEMENT ARTIFICIAL MAGNET

BACKGROUND OF THE INVENTION

The present invention relates generally to the field of spin-dependent scattering of electrons to spin polarize current. In particular, the present invention relates to an artificial magnet with spin polarization enhancement for use in magnetoresistive devices.

Magnetoresistive (MR) devices generally operate by responding to changes in local magnetic flux. For example in a magnetic data storage and retrieval system, a magnetic recording head typically includes a reader portion having a magnetoresistive (MR) sensor for retrieving magnetically encoded information stored on a magnetic disc. Magnetic flux from the surface of the disc causes rotation of the magnetization vector of a sensing layer or layers of the MR sensor, which in turn causes a change in electrical resistivity of the MR sensor. The sensing layers are often called free layers, since the magnetization vectors of the sensing layers are free to rotate in response to external magnetic flux. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

For all types of MR sensors, magnetization rotation occurs in response to magnetic flux from the disc or other magnetic media. As the recording density of magnetic discs continues to increase, the width of the tracks on the disc must decrease, which necessitates more sensitive sensor devices in order to supply the necessary signal amplitude to the preamplifier within a hard disc drive.

MR sensors of present interest can be characterized in two general categories: (1) giant magnetoresistive (GMR) sensors, including spin valve sensors, and (2) tunneling magnetoresistive (TMR) sensors.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers. The resistance of a GMR sensor depends on the relative orientations of the magnetization in consecutive magnetic layers, and varies as the cosine of the angle between the magnetization vectors of consecutive magnetic layers.

Conventional GMR sensors include many classes of sensors including current-in-plane spin valve (CIP-SV), CIP SAF-only SV (synthetical antiferromagnetic), CIP trilayer SV, and current-perpendicular-to-plane (CPP)-SV sensors. A limiting factor in many of CIP sensors is the decrease in amplitude due to loss of free layer area as the reader width decreases. Conventional GMR sensors rely primarily on positive spin symmetry effects. Therefore, further improvement in spin-dependent scattering is one method to improve amplitude in these devices.

TMR sensors have a configuration similar to GMR sensors, except that the magnetic elements (also referred to as electrodes) of the sensor are separated by a barrier layer that is thin enough to allow electron tunneling between the magnetic elements. A first magnetic element serves as a spin polarized source, while the second magnetic element serves as a spin detector or drain. The tunneling probability of an electron incident on the barrier from one electrode depends on the spin state of the electron and the relative orientation between the magnetization of the spin polarized source and the spin detector.

For a TMR device, the magnetoresistance (MR), used as a measure of device sensitivity, is equal to $2P_1P_2/(1-P_1P_2)$ where $P_1$ is the spin polarization for the spin polarized source and $P_2$ is the spin polarization for the spin detector. Spin polarization is defined as $(N\uparrow - N\downarrow)/(N\uparrow + N\downarrow)$, where $N\uparrow, N\downarrow$ are the number of spin-up and spin-down electrons respectively. Therefore in TMR devices, the more effective a spin polarized source is at providing spin selected electrons (spin polarized sense current), the greater the sensitivity of the TMR device. Consequently, there remains a need in the art for improved spin polarization for use in these sensors and other MR devices.

BRIEF SUMMARY OF THE INVENTION

The spin polarization enhancement artificial (SPEA) magnet of the present invention comprises combinations of positive spin asymmetry interfaces and inverse spin asymmetry interfaces arranged such that current passed through the SPEA magnet has enhanced spin polarization. The SPEA magnet additionally may combine bulk material properties of electrons scattering to either supplement or replace the interfacial spin differentiation.

A basic functional unit of the SPEA magnet consists of two ferromagnetic layers separated by two spacer layers. Each spacer is selected to engineer an interface with the adjacent ferromagnetic layer with either positive or inverse spin symmetry. Preferably, both positive and inverse spin symmetry interfaces are formed within the SPEA magnet. Antiferromagnetic arrangement of adjacent ferromagnetic layers coordinates the different spin symmetries such that a single spin state is selected, resulting in enhanced spin polarization of current passing through the SPEA magnet. The antiferromagnetic arrangement also provides additional stabilization to the SPEA magnet.

The SPEA magnet has utility in a variety of applications including MR stacks in transducing heads and spin polarization sources in TMR transducing heads. The SPEA magnet may also be applied in other MR device applications including magnetic random access memory (MRAM).

DETAILED DESCRIPTION

In order to fully appreciate the present invention, bulk and interfacial properties for electron scattering are first reviewed. The use of these properties by the SPEA magnet of the present invention is subsequently described. Proposed applications follow with additional description of additional SPEA magnet structures.

Electrons transiently exist in one of two spin states, which for reference are called spin-up and spin-down. An electron's spin state refers to its intrinsic magnetic moment. Because an electron possesses intrinsic magnetic moment, magnetism influences electron behavior.

Electrons are differentiated by their spin through spin-dependent scattering. Magnetic materials typically possess both bulk material properties and properties existing at a surface or interface of the magnetic material with another material for spin-dependent scattering of electrons. One spin state, for example spin-down, is more highly scattered as the electrons pass though a bulk material or interface. The spin-dependent scattering of the spin-down electrons results in a larger population of spin-up electrons passing though the bulk material or interface. The preferential selection of electrons in one spin state over the other is also referred to as spin polarization.

Spin polarization at an interface or within a bulk material is quantified by a spin polarization ratio, where the spin polarization ratio is the population of spin-up electrons divided by the population of spin-down electrons. According to convention, electrons with a spin oriented with local magnetization are referred to as spin-up electrons, while electrons with spin oriented opposite local magnetization are spin-down electrons. Therefore, a positive spin polarization ratio corresponds to a current enriched with electrons with magnetic moments aligned with local magnetization. Conversely, a negative spin polarization ratio corresponds to current enriched with electrons with magnetic moments opposed to the local magnetization.

Figure 1A:
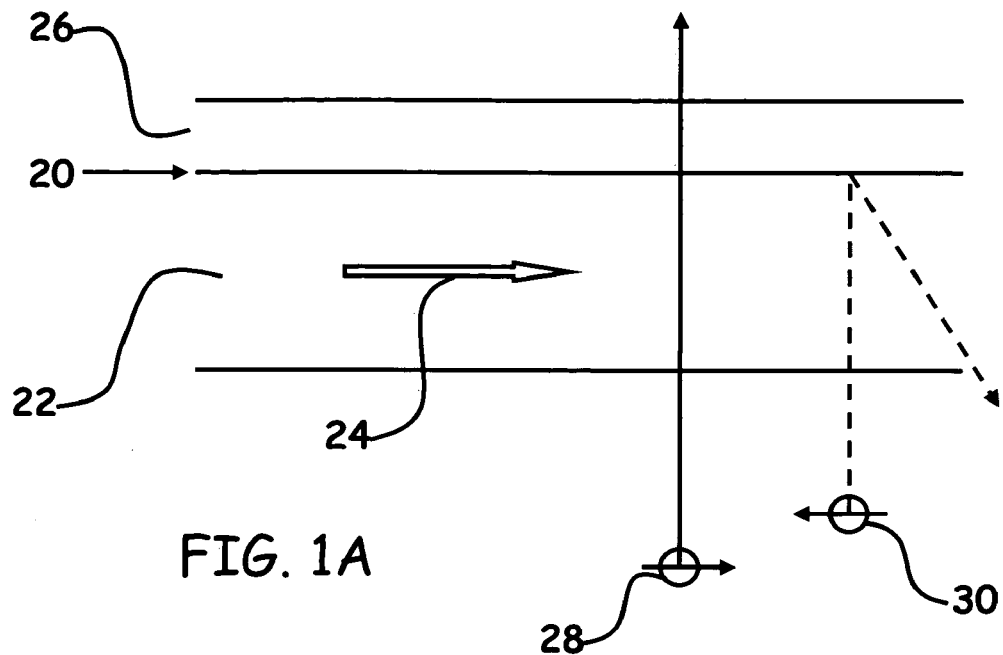
FIG. 1A is a diagram of an interface with positive spin asymmetry.
Figure 1B:
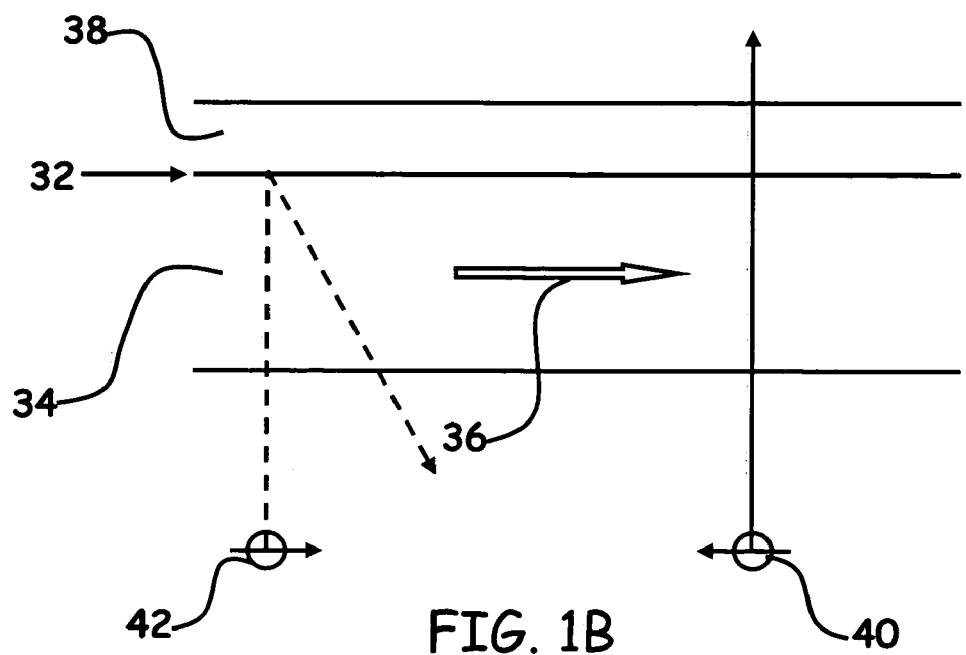
FIG. 1B is a diagram of an interface with inverse spin asymmetry.

FIGS. 1A and 1B illustrate different properties for spin-dependent scattering of electrons at two different interface types. An interface with positive spin asymmetry leads to a positive spin polarization/selection; whereas negative spin polarization/selection results from an interface with inverse spin asymmetry. The operation of interfaces with either positive or inverse spin asymmetry is described in reference to spin-up and spin-down electrons below.

FIG. 1A shows a positive spin asymmetry interface indicated at arrow 20. Positive spin asymmetry interface 20 is formed from a magnetic layer 22 with magnetization 24 contacting an adjacent non-magnetic layer 26. At positive spin asymmetry interface 20, a population of incoming spin-up electrons 28 are scattered less than a population of spin-down electrons 30. Therefore, resistance at positive spin asymmetry interface 20 is smaller for spin-up electrons 28 as compared to spin-down electrons 30. As a consequence, a larger population of spin-up electrons 28 will pass through positive spin asymmetry interface 20, while a greater number of spin-down electrons 30 are scattered. Comparison of the population of spin-up electrons 28 passing through positive spin asymmetry interface 20 to the population of spin-down electrons 30 passing through positive spin asymmetry interface 20 results in a positive spin polarization ratio. Positive spin asymmetry interface 20 also gives positive spin selection.

FIG. 1B shows an inverse spin asymmetry interface indicated by arrow 32. Inverse spin asymmetry interface 32 is formed from a magnetic layer 34 with magnetization 36 contacting an adjacent non-magnetic layer 38. At inverse spin asymmetry interface 32, a population of incoming spin-down electrons 40 are scattered less than a population of spin-up electrons 42, resulting in a negative spin polarization ratio. Negative Spin-dependent Polarization lowers resistance at inverse spin asymmetry interface 32 for spin-down electrons 40 as compared to spin-up electrons 42. Therefore inverse spin asymmetry interface 32 gives a negative spin selection.

Figure 2A:
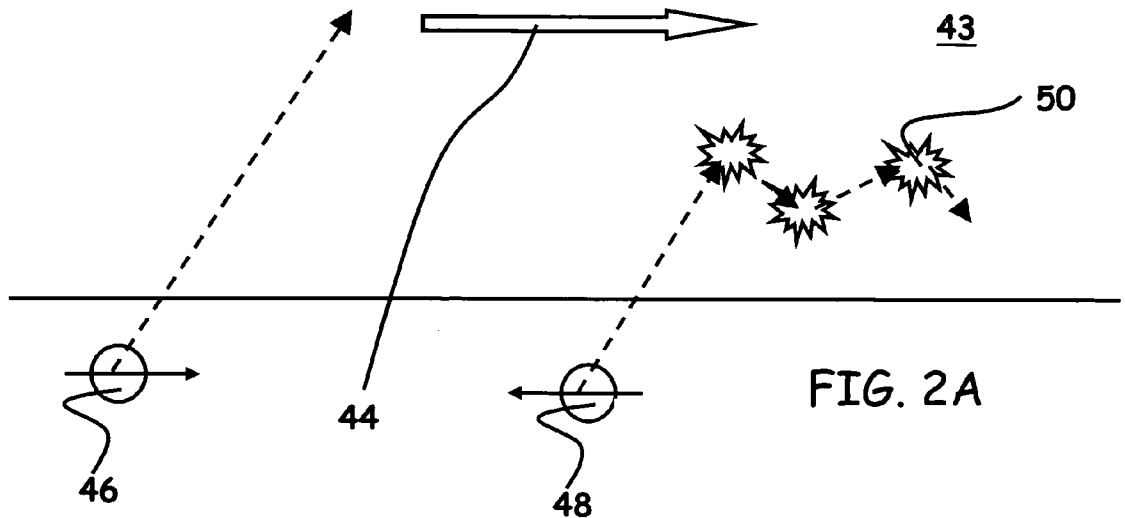
FIG. 2A is a diagram of bulk material with positive spin asymmetry.
Figure 2B:
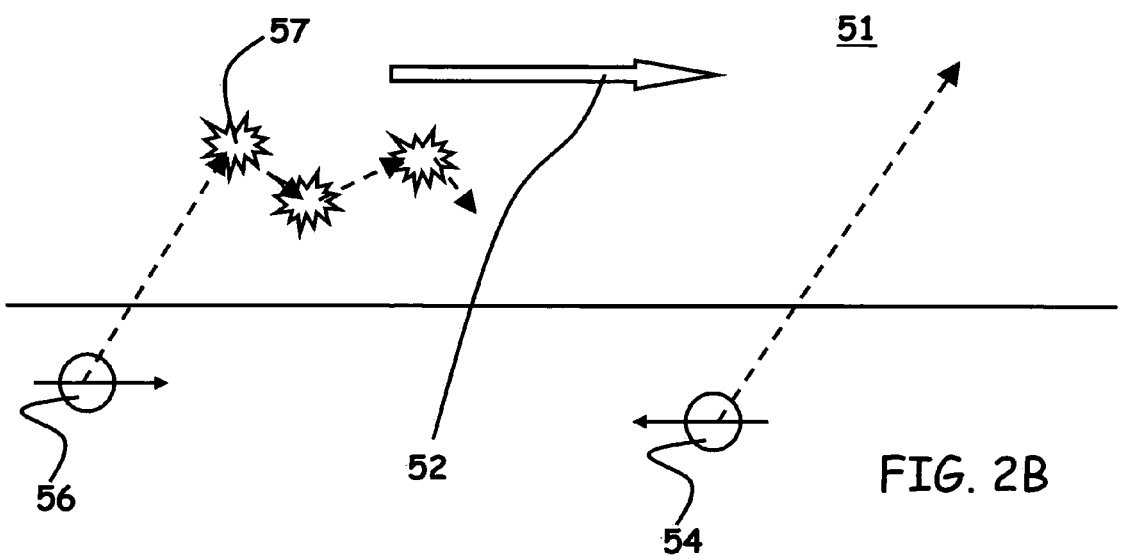
FIG. 2B is a diagram of bulk material with negative spin asymmetry.

FIGS. 2A and 2B illustrate two classes of magnetic material with different bulk properties for spin-dependent scattering of electrons. Bulk spin-dependent scattering of electrons is also either of positive spin asymmetry or inverse spin asymmetry.

FIG. 2A shows a positive spin asymmetry material 43 with magnetization 44. Positive spin asymmetry material 43 scatters a larger population of spin-down electrons 48 relative to a similar population of incoming spin-up electrons 46. Bulk scattering is represented by icon 50. As a consequence, positive spin asymmetry material 43 imparts positive spin polarization to current passed through the material 43. Resistance in positive spin asymmetry material 43 is smaller for spin-up electrons 46 as compared to spin-down electrons 48.

FIG. 2B shows an inverse spin asymmetry material 51 with magnetization 52. Inverse spin asymmetry material 51 has negative due to scattering of electrons with spin aligned to the local magnetism 52. In inverse spin asymmetry material 51, a population of incoming spin-down electrons 54 are scattered less than a population of incoming spin-up electrons 56. Bulk scattering of spin-up electrons 56 is represented at icon 57. Therefore, resistance in inverse spin asymmetry material 51 is smaller for spin-down electrons 54 as compared to spin-up electrons 56. As a consequence, inverse spin asymmetry material 51 results in a current with a negative spin polarization.

The present invention is a spin polarization enhancement artificial (SPEA) magnet that utilizes a novel arrangement of both positive and inverse spin-scattering properties of either or both bulk material and interfaces to enhance spin polarization. Opposing interface types and bulk material classes are organized antiferromagnetically to operate in joint selection of a single spin state in current flowing through an SPEA magnet. The net result is current with enhanced spin-polarization as long as the thickness of the magnet is smaller than the spin diffusion length. The antiferromagnetic organization additionally acts to stabilize the magnet. Various SPEA magnet structures and applications consistent with the present invention are presented below.

SPEA Magnet

Figure 3:
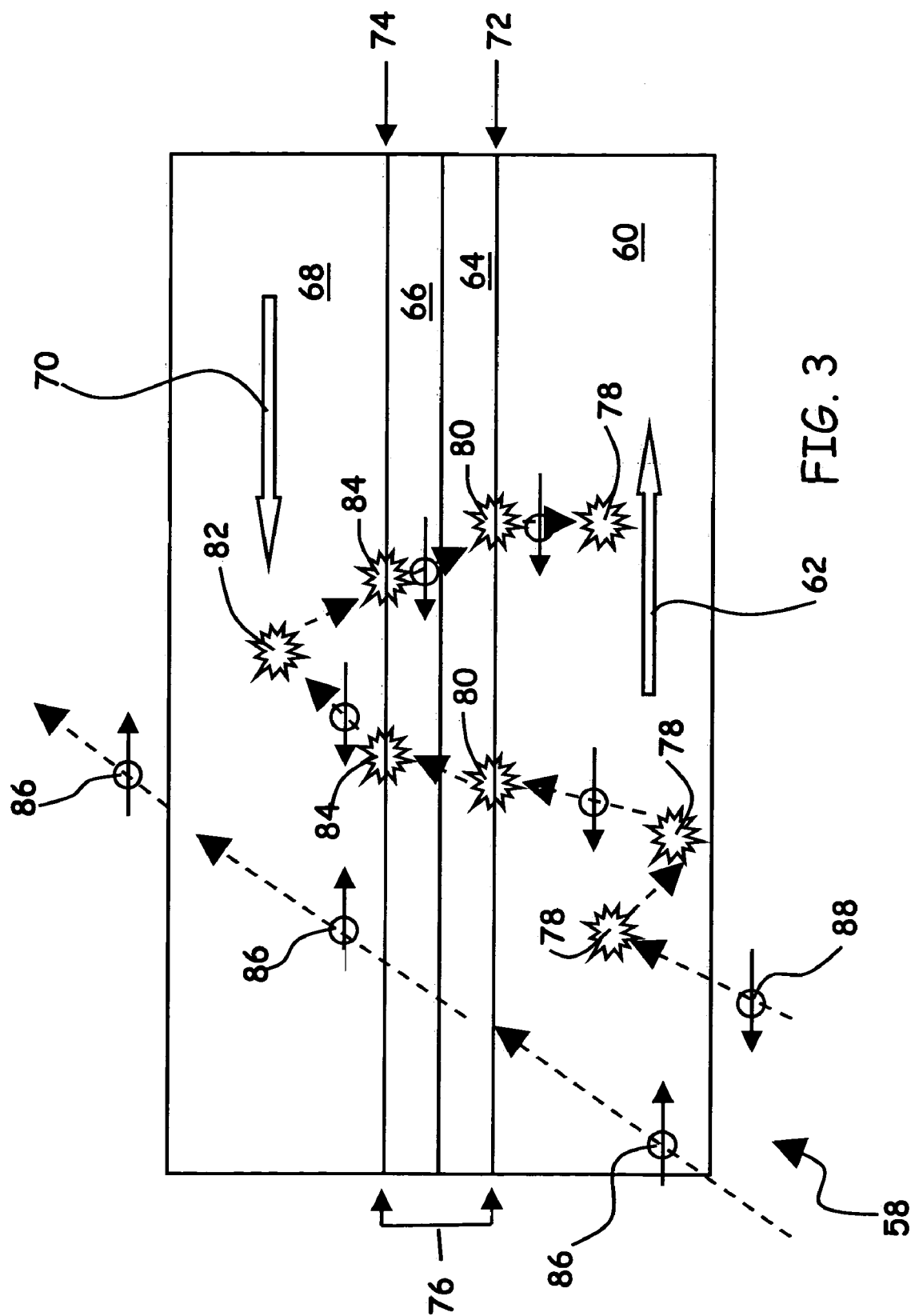
FIG. 3 is a diagram of both bulk and interfacial spin-dependent scattering by the spin polarization artificial magnet of the present invention.

FIG. 3 is a cross-sectional view of a spin polarization enhancement artificial (SPEA) magnet of the present invention. SPEA magnet 58, shown in FIG. 3, includes: first magnetic layer 60 with magnetization 62, first spacer layer 64, second spacer layer 66, and second magnetic layer 68 with magnetization 70. Those four components of the SPEA further combine to form a first interface 72, a second interface 74 and a bi-layer spacer 76.

First magnetic layer 60 contacts first spacer layer 64 thereby forming first interface 72. Similarly, second magnetic layer 68 contacts second spacer layer 66, thereby forming second interface 74. Together first spacer layer 64 and second spacer layer 66 comprise bi-layer spacer 76. A basic unit of an SPEA magnet is a first magnetic layer 60 separated from a second magnetic layer 68 by a bi-layer spacer 76.

The separation of first magnetic layer 60 from second magnetic layer 68 by a bi-layer spacer 76 allows individual selection of material for each spacer layer relative to the material of each adjacent magnetic layer. The magnetic layers are generally selected of magnetic metals, while the spacer layers are formed of non-magnetic metals.

Preferably, the first magnetic layer 60 and second magnetic layer 68, as well as first spacer layer 64 and second spacer layer 66, are selected to form opposite interface types at interfaces 72 and 74. The materials selected for each pair: first magnetic layer 60//first spacer layer 64, and second magnetic layer//second spacer layer 66, are matched to control the type of interface formed at first interface 72 and second interface 74 respectively.

Preferably, an SPEA magnet of the present invention, an example being SPEA magnet 58 of FIG. 3, includes at least one positive spin asymmetry interface and at least one inverse spin asymmetry interface. Alternative embodiments may include additional magnetic layers and spacer layers to create multiple interfaces of each type. Also, as will be further discussed later, an interface may be omitted in lieu of bulk scattering. For example, instead of an inverse spin asymmetry interface, the thickness of a magnetic layer with bulk inverse spin asymmetry is placed instead or in addition to the interface. In embodiments with multiple interfaces, it is advantageous to generally alternate interface types across the SPEA magnet.

In the example SPEA magnet 58 depicted in FIG. 3, first interface 72 has positive spin asymmetry. Suitable materials for magnetic layers at positive spin asymmetry interfaces are Co, Fe, NiFe, CoFe and NiCoFe. A suitable material for a non-magnetic layer at a positive spin asymmetry interface is Cu, Ag and Au. For example, first magnetic layer 60 is formed of Co with first spacer layer 64 formed of Cu.

Conversely, second interface 74, as shown in FIG. 3, has inverse spin asymmetry. Suitable materials for magnetic layers at inverse spin asymmetry interfaces are Fe, FeCr, FeV, NiCr, FeMo or FeCrV. A suitable material for a non-magnetic layer at an inverse spin asymmetry interface is Mo, Cr, or V. For example, second interface 74 is created by forming second magnetic layer 64 of FeV with adjacent spacer layer 66 formed of Mo.

Additionally, the properties of bulk material scattering may influence the material selection for the first and second magnetic layers. Typically, the amount of spin-dependent scattering contributed by bulk magnetic material is controlled by changing the thickness of the layer. The thickness of the magnetic layer may be increased to increase bulk scattering where desired and minimized where bulk scattering is not desired or opposes interfacial scattering processes.

Particular applications, for example a SPEA magnet used in a TMR sensor requires the total stack height of the SPEA magnet to be less than the spin diffusion length for the applied current. Where the total thickness exceeds the spin diffusion length, polarization is reduced or lost. Consequently, layer thickness is limited. However, for SPEA magnet used as a MR sensor, there is no such restriction that the total thickness of the stack needs to be smaller than spin diffusion length.

For an interface with positive spin asymmetry, the material selected for the corresponding magnetic layer preferably, but is not required to, also possess bulk positive spin asymmetry. Bulk positive spin asymmetry materials include most familiar ferromagnetic elemental materials and alloys, such as CoFe, Fe, Co and Ni. Both the interface and bulk magnetic material contribute to positive spin polarization where both have positive spin asymmetry. For example, first magnetic layer 60, as illustrated in FIG. 3, is formed of a material, one example being Co, which exhibits positive spin asymmetry bulk scattering 78 and positive spin asymmetry interfacial scattering 80 at first interface 72 with first spacer layer 64 of Cu.

Inverse spin asymmetry interfaces are similarly preferably matched with bulk magnetic materials having inverse spin asymmetry. Inverse spin asymmetry is typically found in ferromagnetic alloys. Inverse spin asymmetry material includes, but is not limited to, alloys of: FeV, NiCr, and FeCr. Therefore, selection for example of FeV for second magnetic layer 68 will contribute to inverse spin asymmetry with both inverse spin asymmetry bulk scattering 82 and inverse spin asymmetry interfacial scattering 84.

In the SPEA magnet of the present invention matching the bulk and interfacial spin asymmetry is not required. The material chosen for a magnetic layer may have bulk spin asymmetry in opposition to the spin asymmetry corresponding interface. Where the bulk spin asymmetry does not match the spin asymmetry of the adjacent interface, the bulk scattering reduces the desired spin polarization. Therefore, it is advantageous to minimize the bulk scattering in favor of the interface spin polarization by minimizing the thickness of the magnetic layer. Minimizing the magnetic layer thickness allows interfacial scattering to dominate such that contributions by bulk scattering to the net polarization can be neglected. This allows the formation, for example, of inverse spin asymmetry interfaces using bulk magnetic materials with positive spin asymmetry.

In the SPEA magnet of the present invention, the magnetization of each magnetic layer is oriented in a direction for proper magnet operation. Both bulk and interfacial spin polarization are dependent on the: local magnetization to determine which spin state is favored. A magnetic layer associated with positive spin asymmetry either through bulk or interfacial effects preferably is arranged antiferromagnetically from magnetic layers with inverse spin asymmetry. At a minimum, magnetic layers with opposite spin asymmetry must have magnetizations oriented such that a vector component of the net magnetization of each magnetic layer is organized antiferromagnetically. Antiferromagnetic organization is driven by magnetostatic coupling between magnetic layers and consequently stabilizes the SPEA magnet. The antiferromagnetic arrangement of magnetization typically occurs after an SPEA magnet is patterned during formation. Alternatively, thickness of bi-layer spacers can be manipulated to introduce RKKY coupling to control an antiferromagnetic alignment of alternate magnetic layers giving a more stable magnetic state to the SPEA magnet.

Antiferromagnetic organization is important for improved spin polarization by the SPEA magnet as demonstrated below.

FIG. 3 additionally illustrates spin polarization by SPEA magnet 58. Electric current (not shown) generally flows perpendicular to the layers of SPEA magnet 58. In FIG. 3, the current as represented by electrons 86 and 88 flows roughly from bottom to top, although the flow is not limited to that direction and may alternately flow top to bottom.

Electrons 86 and 88 are representative of larger populations of electrons in each of the two spin states. The spin state of electron 86 is oriented to the right and the spin state of electron 88 is oriented to the left as illustrated in FIG. 3. As electrons 86 and 88 flow into and through SPEA magnet 58, they are spin-differentiated by the bulk materials and interfaces.

First magnetic layer 60, as described previously, has bulk positive spin asymmetry. Therefore, electron 86 in the spin-up state, whose spin is aligned with magnetization 62 of first magnetic layer 60, is favored and passes through first magnetic layer 60. In contrast, electron 88 in the spin-down state, whose spin is opposite magnetization 62, is scattered by the bulk material as represented by bulk scattering 78. Similarly, first interface 72, which has positive spin asymmetry favors electron 86 and scatters electron 88. Interfacial scattering of electron 88 is represented at icons 80 in FIG. 3.

Second interface 74 has inverse spin asymmetry. Consequently, electron 86, which is spin-down relative to magnetization 70, passes through second interface 74; while electron 88, which is spin-up, is scattered. Second magnetic layer 68 also has inverse spin asymmetry thereby similarly favoring electron 86. Larger numbers of electrons in the spin state of electron 86 pass through SPEA magnet 58, while the opposite spin state of electron 88 is more heavily scattered. The net result is current with enhanced spin-polarization as long as the thickness of SPEA magnet 58 is smaller than the spin diffusion length.

Figure 4:
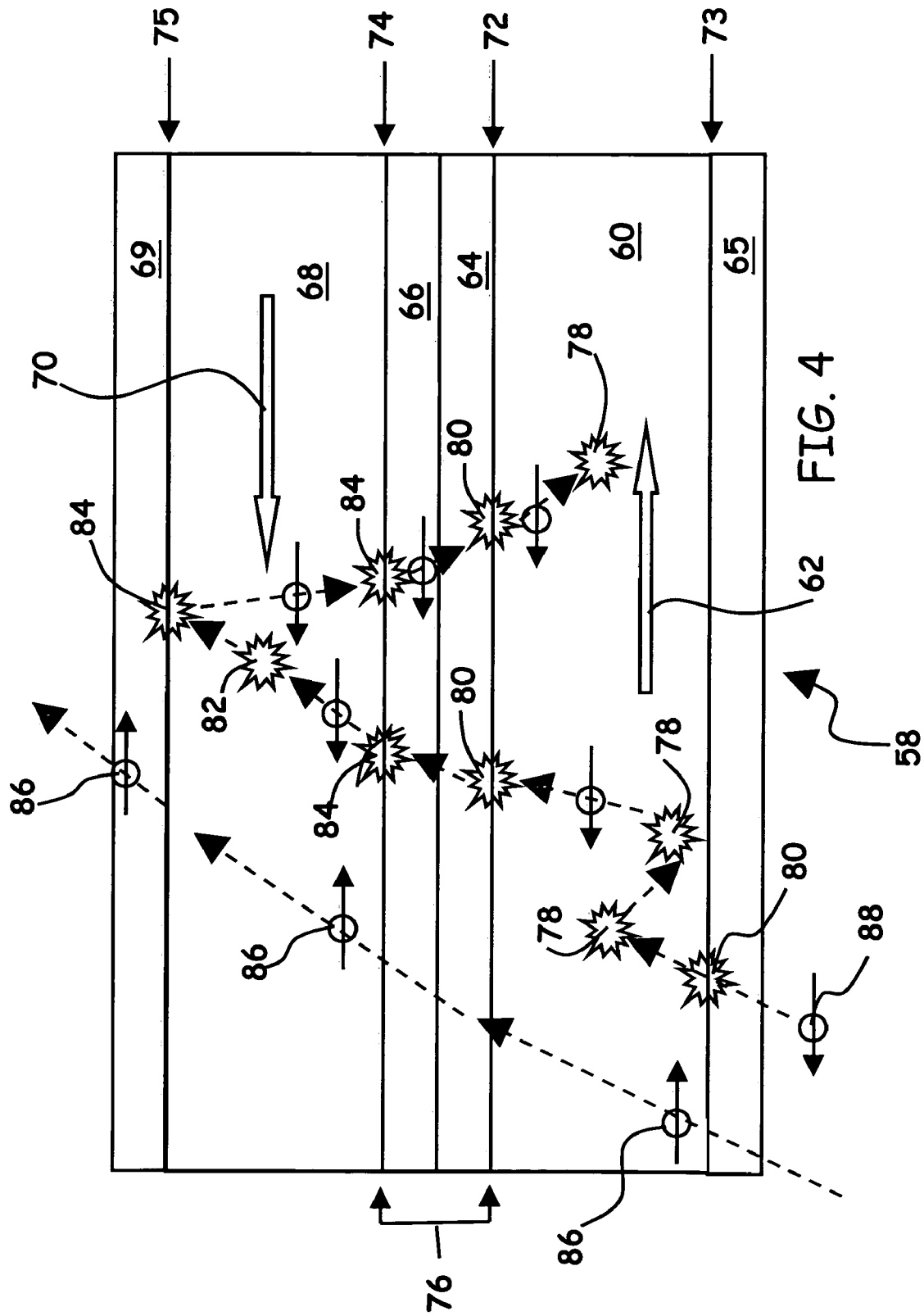
FIG. 4 is a diagram of both bulk and interfacial spin-dependent scattering by the spin polarization artificial magnet including additional spacers.

FIG. 4 shows SPEA magnet 58 with an additional positive spin symmetry interface 73 and an additional inverse spin asymmetry interface 75 for further enhancement of spin-polarization. Interface 73 is created by adding a bottom spacer 65 adjacent to first magnetic layer 60. Bottom spacer 65 may be formed of the same material as spacer 64 or any material suitable for a non-magnetic layer at a positive spin asymmetry interface as described above. Interface 75 is created by adding a top spacer 69 adjacent to second magnetic layer 68. Top spacer 69 may be formed of the same material as spacer 64 or any material suitable for a non-magnetic layer at an inverse spin asymmetry interface as described above.

SPEA magnet 58 with added interfaces 73 and 75 operates consistent with the description provided above for FIG. 3. Interface 73 functions with positive spin asymmetry similar to interface 72, while interface 75 generally functions with inverse spin asymmetry for spin selection similar to interface 74.

SPEA magnet 58 uses a combination of bulk and interfacial spin polarization to achieve the desired spin selection. Alternative embodiments may further enhance either or both interfacial spin polarization and bulk scattering. SPEA magnet 58, either with or without added top and bottom spacers, is a functional unit of the present invention and may be modified in several ways to form alternative embodiments. For example, multiple units may be used in combination for further enhancement of spin polarization. Additionally, the arrangement of interface types and the number of interfaces may be changed. A variety of alternative structures of the SPEA magnet of the present invention are presented below.

CPP MR Stack

Figure 5A:
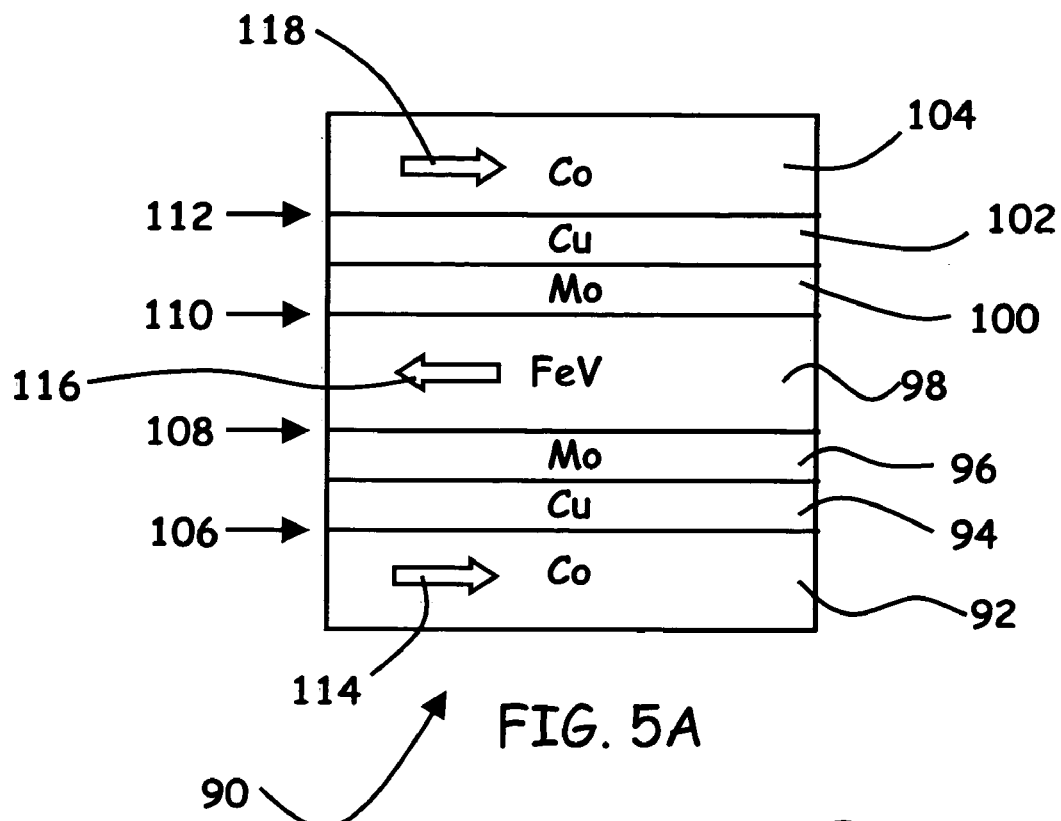
FIG. 5A is an air-bearing view of a first embodiment of an SPEA magnet applied in a reader stack of a CPP transducing head.
Figure 5B:
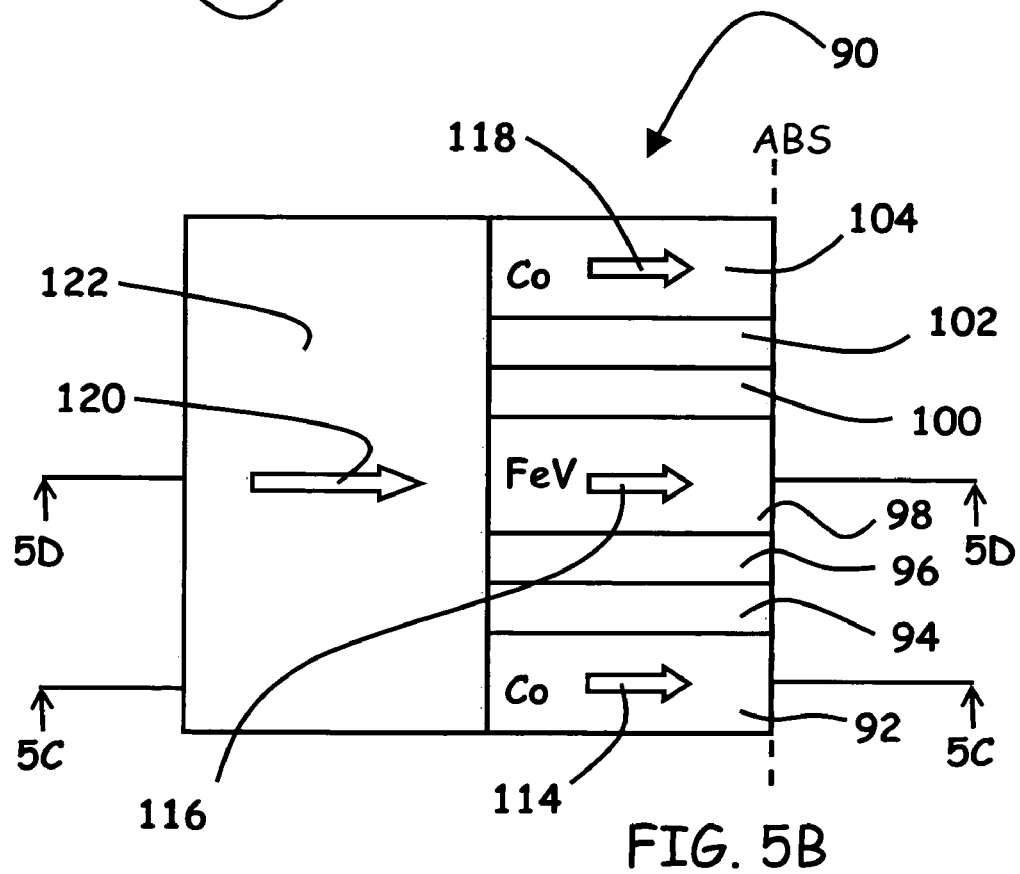
FIG. 5B is a cross-sectional view taken perpendicular to the ABS of an SPEA magnet reader stack with bias structure.
Figure 5C:
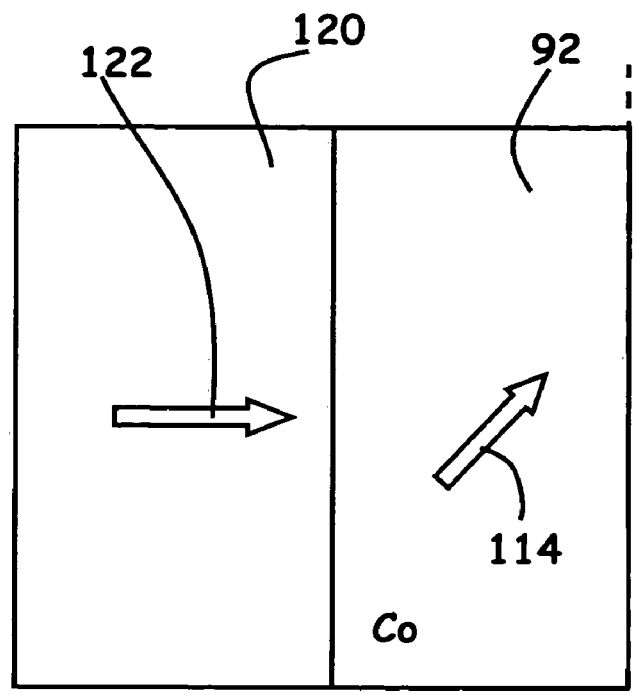
FIGS. 5C and 5D are plan views illustrating the magnetization in the magnetic layers of an SPEA magnet reader stack.
Figure 5D:
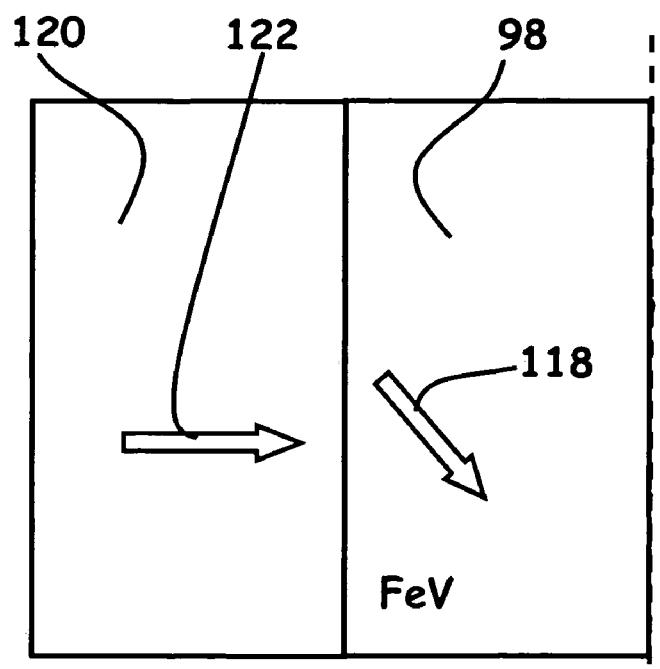

FIG. 5A through FIG. 5D illustrate a first alternative embodiment for the SPEA magnet and a proposed application thereof. FIG. 5A is a shield to shield air-bearing view of an alternative SPEA magnet as a current-perpendicular-to-plane (CPP) reader stack. FIG. 5B is a cross-sectional view of the SPEA magnet CPP reader stack including bias structure. FIG. 5C and 5D are plan views illustrating the magnetization in the magnetic layers of the SPEA magnet for biasing as a CPP reader stack.

FIG. 5A illustrates a first alternative embodiment 90 of the SPEA magnet. SPEA magnet 90 comprises: first magnetic layer 92, first spacer layer 94, second spacer layer 96, second magnetic layer 98, third spacer layer 100, fourth spacer layer 102, and third magnetic layer 104. SPEA magnet 90 also comprises: first interface 106, second interface 108, third interface 110, and fourth interface 112.

First magnetic layer 92 contacts first spacer layer 94 thereby forming first interface 106. Similarly, second magnetic layer 98 contacts second spacer layer 96, thereby forming second interface 108. First spacer layer 94 and second spacer layer 96 may also be described as a bi-layer spacer. Second magnetic layer 98 additionally contacts third spacer layer 100 thereby forming third interface 110. Third magnetic layer 104 contacts fourth spacer layer 102 thereby forming fourth interface 112. Third spacer layer 100 and fourth spacer layer 102 may also be described as a bi-layer spacer.

First interface 106 and fourth interface 112 preferably exhibit positive spin asymmetry. Materials for first magnetic layer 92 and third magnetic layer 104, as well as first spacer layer 94 and fourth spacer layer 102, are selected accordingly. In addition, first magnetic layer 92 and third magnetic layer 104 may be formed of a material with positive spin asymmetry and sufficient thickness for positive spin asymmetry bulk scattering.

Second interface 108 and third interface 110 preferably exhibit inverse spin asymmetry. Materials for second magnetic layer 98, second spacer layer 96 and third spacer layer 100, are selected accordingly as described above. In addition, second magnetic layer 98 is preferably formed of a material with inverse spin asymmetry and sufficient thickness to contribute inverse spin asymmetry bulk scattering. Second magnetic layer 98 may alternatively be formed of a material, such as Fe, that creates inverse spin asymmetry interfaces without having bulk inverse spin asymmetry properties.

Alternatively, where second magnetic layer 98 is formed of a material with bulk inverse spin asymmetry properties, second spacer layer 96 and third spacer layer 100 may be omitted. When spacer layer 96 and third spacer layer 100 are omitted, second interface 108 and third interface 110 are consequently omitted. The resulting SPEA magnet relies on bulk scattering within second magnetic layer 98 for inverse spin asymmetry.

Suggested or example material selections for the layers of SPEA stack 90 are shown in FIG. 5A. First magnetic layer 92 and third magnetic layer 104 are formed of Co, while second magnetic layer 98 is formed of FeV. Two bi-layer spacers separating the magnetic layers are formed from Cu (first and fourth spacer layers 94 and 102) and Mo (second and third spacer layers 96 and 100). SPEA stack 90 is not limited to those materials and may incorporate alternative materials with similar properties.

First magnetic layer 92 is shown with magnetization 114. Second magnetic layer 98 has magnetization 116, while third magnetic layer 104 has magnetization 118. Magnetizations 114 and 118 preferably share a common orientation. Conversely, magnetization 116 of second magnetic layer 98 is preferably oriented anti-ferromagnetically from magnetizations 114 and 118 in first magnetic layer 92 and third magnetic layer 104 respectively.

SPEA magnet 90 comprises inverse spin asymmetry at second interface 108 and third interface 110, in combination with positive spin asymmetry at first interface 106 and fourth interface 112, to enhance spin polarization. Preferably, negative spin-dependent scattering occurs within the bulk material of second magnetic layer 98. Inverse spin asymmetry bulk scattering increases current carrying capabilities and current efficiency of SPEA magnet 90. Additionally, bulk material of first magnetic layer 92 and third magnetic layer 104 may contribute positive spin asymmetry.

The use of SPEA magnet 90 in an MR reader typically requires an applied bias to maintain a single domain state in the magnetic layers. FIG. 5B is a cross-sectional view taken perpendicular to the ABS of a proposed biasing scheme for a CPP reader incorporating SPEA magnet 90 as the reader stack. Hard bias element 120 is placed behind SPEA magnet 90 relative to the ABS. Hard bias element 120 with magnetization 122 influences magnetizations 114, 116 and 118 of magnetic layers 92, 98, and 104 respectively in the direction perpendicular to the ABS. Consequently, magnetization 114, magnetization 116, and magnetization 118 include vector components perpendicular to the ABS.

FIG. 5C is a sectional view taken along line 5C—5C in FIG. 5B of first magnetic layer 92 with hard bias element 120. Magnetization 114 of first magnetic layer 92 also includes a vector component positioned approximately 45° from perpendicular to the ABS. The magnetization 114 reflects a compromise between the biasing effect of magnetization 120 of hard bias element 120 and the anti-ferromagnetic arrangement 90. Third magnetic layer 104 is similarly arranged. FIG. 5D is a sectional view taken along line 5D—5D in FIG. 5B of second magnetic layer 98 with hard magnetic element 120. Magnetization 116 of second magnetic layer 98 is positioned approximately 45° from perpendicular to the ABS but is pointed to the left opposite of magnetization 114 of the first magnetic layer 92 and magnetization 118 of third magnetic layer 104. Magnetization 116 of second magnetic layer 98 reflects the compromise between the influence of magnetization 122 or hard bias element 120 and the anti-ferromagnetic arrangement of SPEA magnet 90. The rear positioning of hard bias element 120 allows the angle between the magnetizations of two neighboring magnetic layers to be approximately 90° as is shown in FIGS. 5C and 5D.

An MR device including an SPEA magnet, such as SPEA magnet 90, generally enhances stack resistance and spin selection for one spin state across whole stack thereby increasing amplitude compared with conventional MR heads. The current density requirement for effective reading is also advantageously reduced for achieving the targeted amplitude output.

SPEA magnet 90 may contribute to improved amplitude output in several ways. In addition, these ways allow customization of SPEA magnet 90 output. Amplitude output of a CPP stack is described by the following equation: Amplitude=$\Delta R*I=(\Delta R/R)*RA*j=(\Delta R/R)*\rho t*j$ where ($\Delta R/R$) is the MR ratio, RA is the product of stack area and resistance, j is the current density limit, $\rho$ is the stack resistivity and t is the thickness of the stack. Enhanced spin polarization from SPEA magnet 90 increases ($\Delta R*A$), thereby increasing amplitude. Both, increasing number of interfaces and incorporating negative alloy materials into SPEA magnet increase stack RA, therefore increasing amplitude. In addition, the thickness of second magnetic layer 98 may be increased to balance edge charges in first magnetic layer 92 and third magnetic layer 104, thereby increasing stack stability. Also, by forming second magnetic layer 98 of a material with bulk inverse spin asymmetry, the current efficiency and ($\Delta R/R$) are increased in addition to easing spin torque transfer effects.

Additional layers, commonly used with MR stacks in transducing heads such as cap layers, seed layers or additional spacers may be employed with SPEA magnet 90. SPEA magnet 90 may also be utilized as an MR stack in a current-in-plane (CIP) MR reader. A biasing scheme similar to that described for a CPP reader in FIGS. 5B–5D may also be applied to a CIP reader comprising SPEA magnet 90.

TMR Sensor

Figure 6:
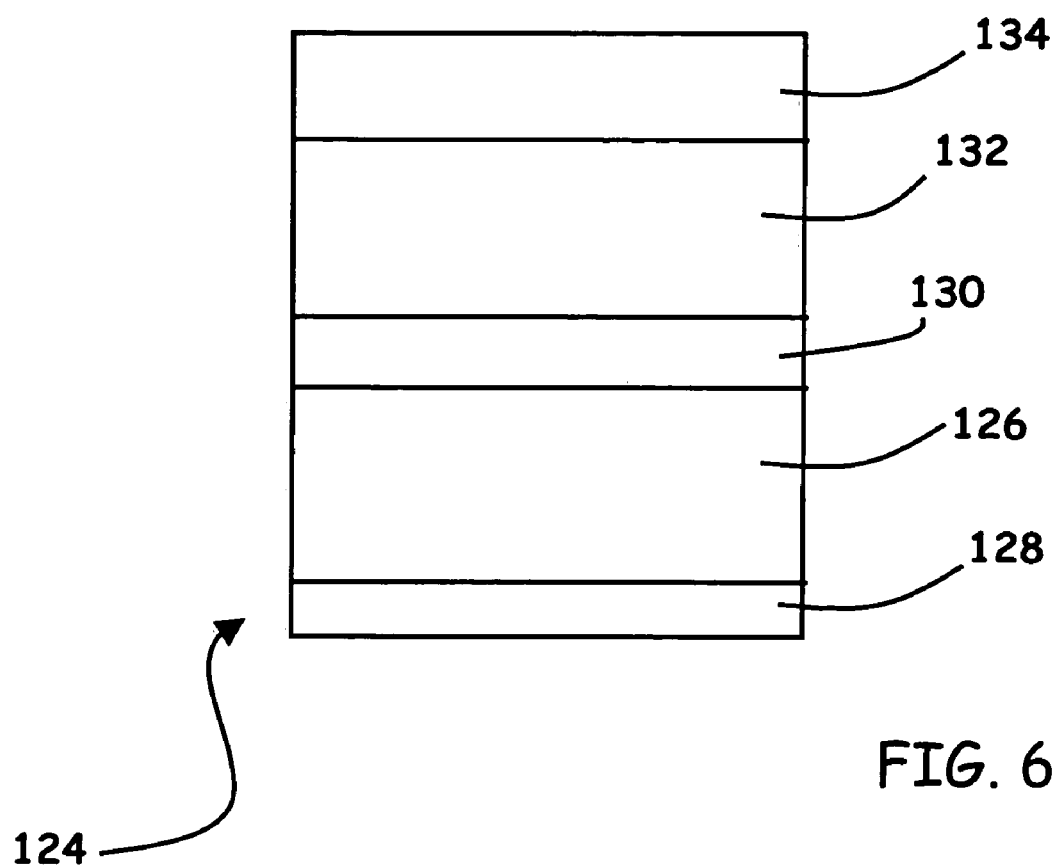
FIG. 6 is a cross-sectional view of a TMR stack including a SPEA magnet.

FIG. 6 is an air bearing view of a tunneling magnetoresistive (TMR) stack 124 incorporating an SPEA magnet 126. TMR stack 124 includes: seed layer 128, SPEA magnet 126, barrier layer 130, free layer 132, and cap 134. Free layer 132 serves as a spin detector and is free to rotate subject to external magnetic fields, while SPEA magnet 126 operates as a spin-polarized source. Barrier layer 130 is a dielectric material positioned between free layer 132 and SPEA magnet 126. Free layer 132 is a ferromagnetic material typically overlaid with cap 134. Seed layer 128 is optionally positioned below SPEA magnet 126.

Figure 7:
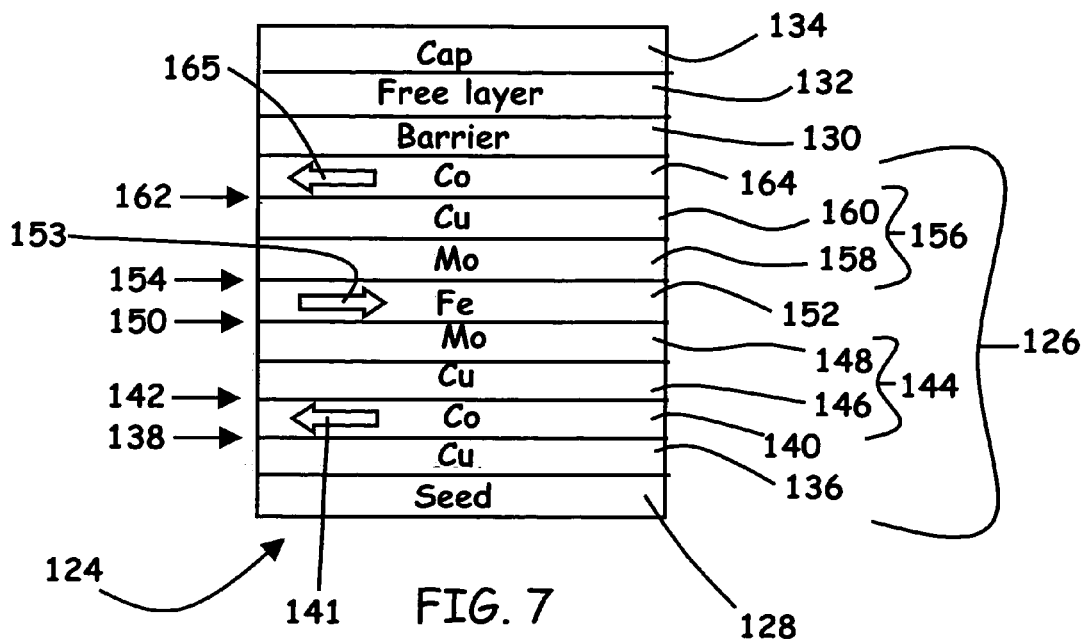
FIG. 7 is a TMR stack including a third embodiment of an SPEA magnet.

FIG. 7 is an air bearing view of TMR stack 124 illustrating the layered structure of a third SPEA magnet embodiment. SPEA magnet 126 comprises: bottom spacer 136; first interface 138; first magnetic layer 140 with magnetization 141; second interface 142; first bi-layer spacer 144 formed of first layer 146 and second layer 148; third interface 150; second magnetic layer 152 with magnetization 153; fourth interface 154; second bi-layer spacer 156 formed of first layer 158 and a second layer 160; fifth interface 162; and third magnetic layer 164 with magnetization 165. Barrier layer 130, free layer 132 and optional seed layer 128 of TMR stack 124 are also shown.

First interface 138 is formed at the bottom of first magnetic layer 140 where it contacts bottom spacer 136. Second interface 142 is formed at the top of first magnetic layer 140 where it contacts first layer 146 of first bi-layer spacer 144. Third interface 150 is formed at the bottom of second magnetic layer 152 where it contacts second layer 148 of bi-layer spacer 144. Fourth interface 154 is formed at the top of second magnetic layer 152 where it contacts first layer 158 of second bi-layer spacer 156. Fifth interface 162 is formed at the bottom of third magnetic layer 164 where it contacts second layer 160 of second bi-layer spacer 156. The top of third magnetic layer 164 contacts barrier layer 130, while bottom spacer 136 contacts optional seed layer 128.

Magnetization 141 of first magnetic layer 140 and magnetization 165 of third magnetic layer 164 preferably have a common orientation. Magnetization 153 of second magnetic layer 152 is oriented so as have at least a portion of magnetization 153 oriented antiferromagnetically from magnetization 141 of first magnetic layer 140 and magnetization 165 of third magnetic layer 164. Opposing magnetization 153 of second magnetic layer 152 allows for magnetostatic or RKKY coupling with first magnetic layer 140 and third magnetic layer 152 thereby stabilizing SPEA magnet 126.

The TMR value of TMR stack 124 is increased due to improved spin polarization ratios between the SPEA magnet—spin polarized source 126 and the free layer—rain 132. SPEA magnet 126 primarily utilizes interfacial scattering to achieve spin polarization. Interfacial scattering dominates and bulk scattering can be largely ignored because the thickness of the magnetic layers is minimized such that bulk scattering is negligible.

SPEA magnet 126 may be configured with a number of possible combinations of positive and inverse spin asymmetry interfaces to produce net spin-dependent scattering, therefore selecting a single spin orientation throughout SPEA magnet 126. An example arrangement of interface types is provided for SPEA magnet 126 as illustrated in FIG. 7. First interface 138 and second interface 142 are positive spin asymmetry interfaces. Fifth interface 162 is also of positive spin asymmetry. In between second interface 142 and fifth interface:162, are third and fourth interface 150 and 154 with inverse spin asymmetry. Therefore, SPEA magnet 126 has alternating groupings of positive—verse—positive spin symmetry interfaces.

FIG. 7 further provides an example material selection for each layer of SPEA magnet 124 to correspond with the selected interface types described above. An example material for each layer includes: bottom spacer 136 of Cu; first magnetic layer 140 of Co; first bi-layer spacer 144 including first layer 146 of Cu and second layer 148 of Mo; second magnetic layer 152 of Fe; second bi-layer spacer 156 including first layer 158 of Mo and a second layer 160 of Cu; and third magnetic layer 164 of Co. Other materials may be selected based on the desired interface as described above.

Inverse spin asymmetry interfaces (third interface 150 and fourth interface 154) are created by forming second magnetic layer 152 of Fe or other suitable material, and adjacent spacer layers (second layer 148 of first bi-layer spacer 144 and first layer 158 of second bi-layer spacer 156) of Mo or other suitable material. Positive spin asymmetry interfaces [first, second and fifth interfaces, 142, 150 and 162 respectively] are created by forming first magnetic layer 140 and third magnetic layer 164 of Co or other suitable material, and forming adjacent spacers [bottom spacer 136, first layer 146 of first bi-layer spacer 144, and second layer 160 of second bi-layer spacer 156] of Cu or other suitable material.

Figure 8:
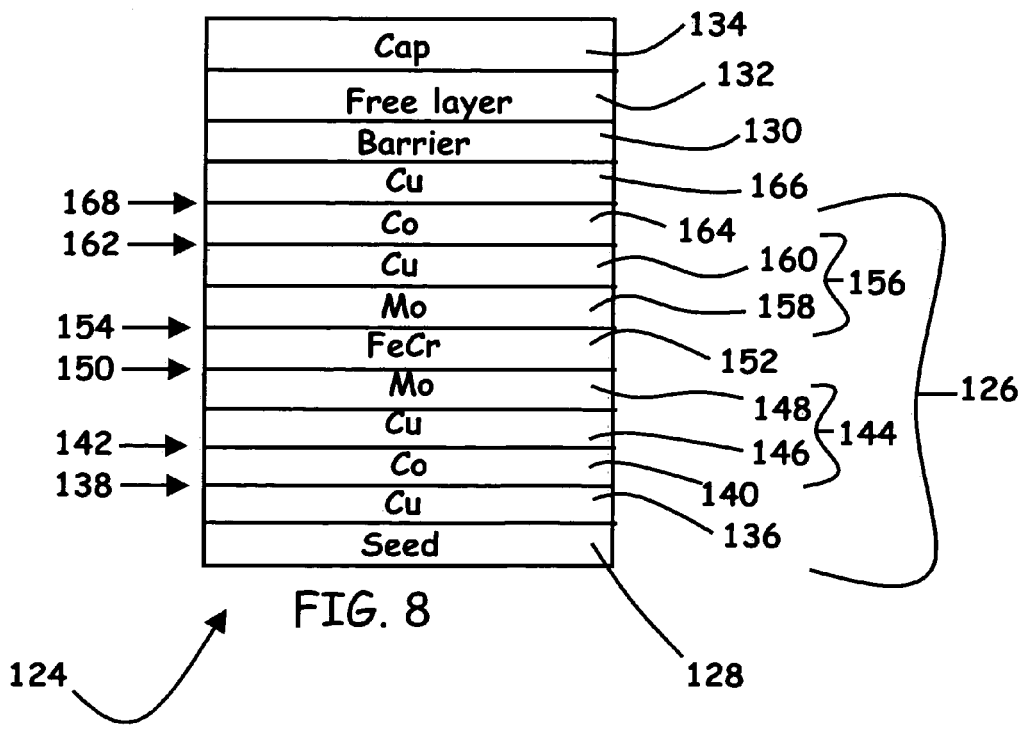
FIG. 8 is a TMR stack including a fourth embodiment of an SPEA magnet.

FIG. 8 illustrates two modifications to SPEA magnet 126 shown in FIG. 7. First, an additional spacer layer 166 separates third magnetic layer 164 from barrier 102. Spacer layer 166 contacts third magnetic layer 164 forming an additional interface 168. Based on the proposed material selections above, spacer layer 166 is formed from Cu or other suitable material thereby creating a positive spin asymmetry interface with third magnetic layer 164 of Co.

FIG. 8 also suggests an alternate material for second magnetic layer 152. By changing the material for second magnetic layer 152 from Fe to a bulk inverse spin asymmetry material such as FeCr, the bulk scattering in the second magnetic layer 152 is changed from positive to inverse spin asymmetry to match the adjacent interface. Bulk inverse spin asymmetry may be increased by increasing the thickness of second magnetic layer 152. First and third magnetic layers 140 and 164 may be similarly modified for bulk positive spin asymmetry.

When an SPEA magnet is used in TMR sensors, the total thickness of the SPEA magnet (e.g. SPEA magnet 126 in TMR stack 124 of FIGS. 6 and 7) should be less than spin diffusion length.

MRAM

Figure 9:
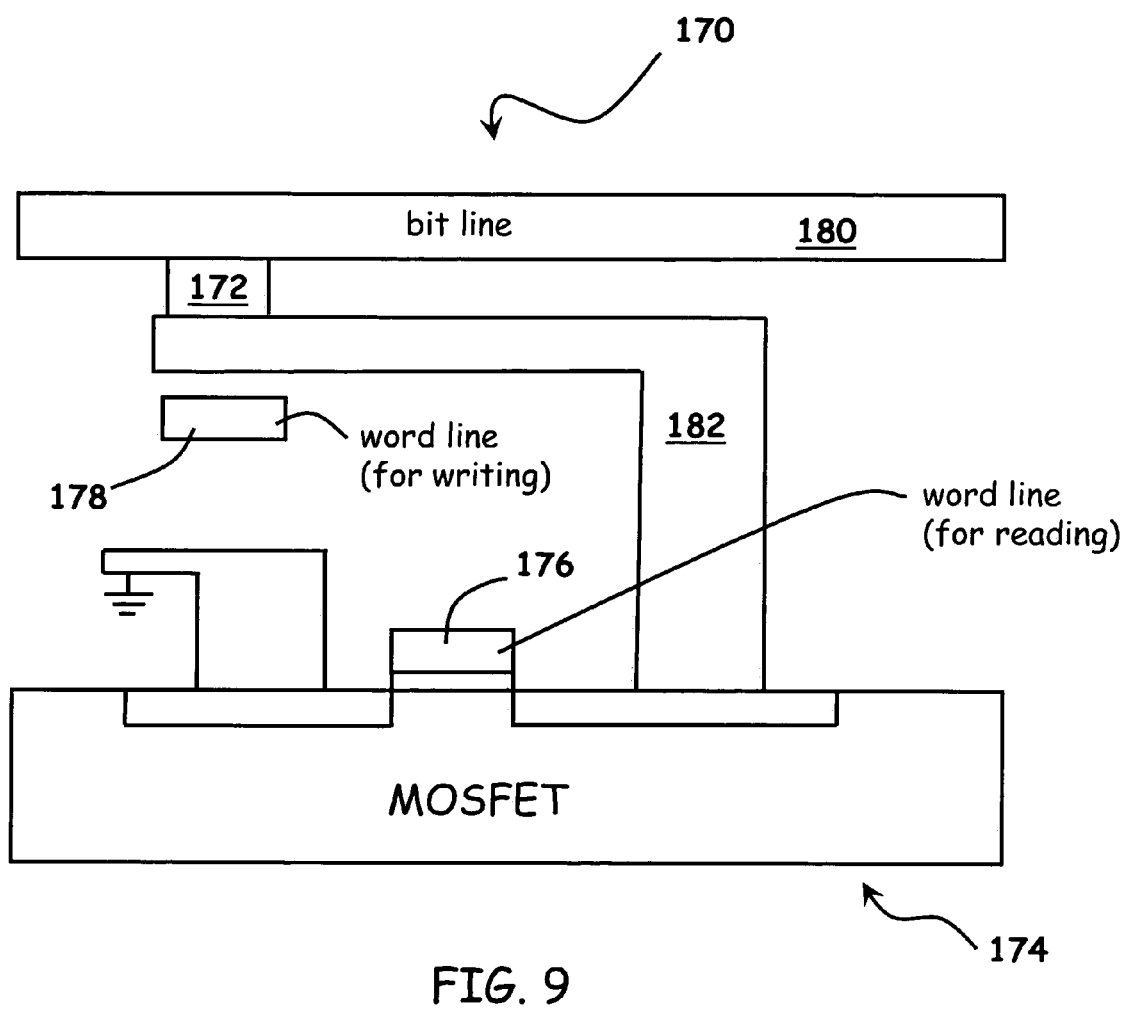
FIG. 9 is a cross-sectional view of a magnetic random access memory (MRAM) including an SPEA magnet.

FIG. 9 illustrates a solid state memory device, such as a magnetic random access memory (MRAM). MRAMs are memories in which data can be stored under an address and also be read out again. The memories generally have one or more memory cells. In each cell, the memory effect resides in a MR device therein. FIG. 9 is a cross-sectional view of individual memory cell 170 of an MRAM including an SPEA magnet 172 as an MR device, MOSFET 174 (including gate 176, or read word line 176), write word line 178, bit line 180, and vias 182 and 184.

Memory cell 170 is part of a larger array, not shown, that includes a plurality of write word lines and bit lines arranged in a grid, such that a selected memory cell can be written to by supplying a current to both the specific write word line and bit line that crossover the selected memory cell. In the example of FIG. 9, current is supplied through write word line 178 and bit line 180 to write data to memory cell 170. The electric current flowing in write word line 178 and bit line 180 creates a magnetic field, which in turn acts, upon SPEA magnet 172 to write data thereto. The content of SPEA magnet 172 is read by supplying a current through it to ascertain the resistance thereof. Accordingly, to read data from SPEA magnet 172, current is provided to bit line 180, and read word line 176 is activated to allow current to progress from bit line 170, SPEA magnet 172, via 182, and MOSFET 174. A source terminal of MOSFET 174 is electrically connected to SPEA magnet 172 through via 182, while a drain terminal of MOSFET 174 is grounded through via 184.

Additional SPEA Magnet Embodiments

Figure 10:
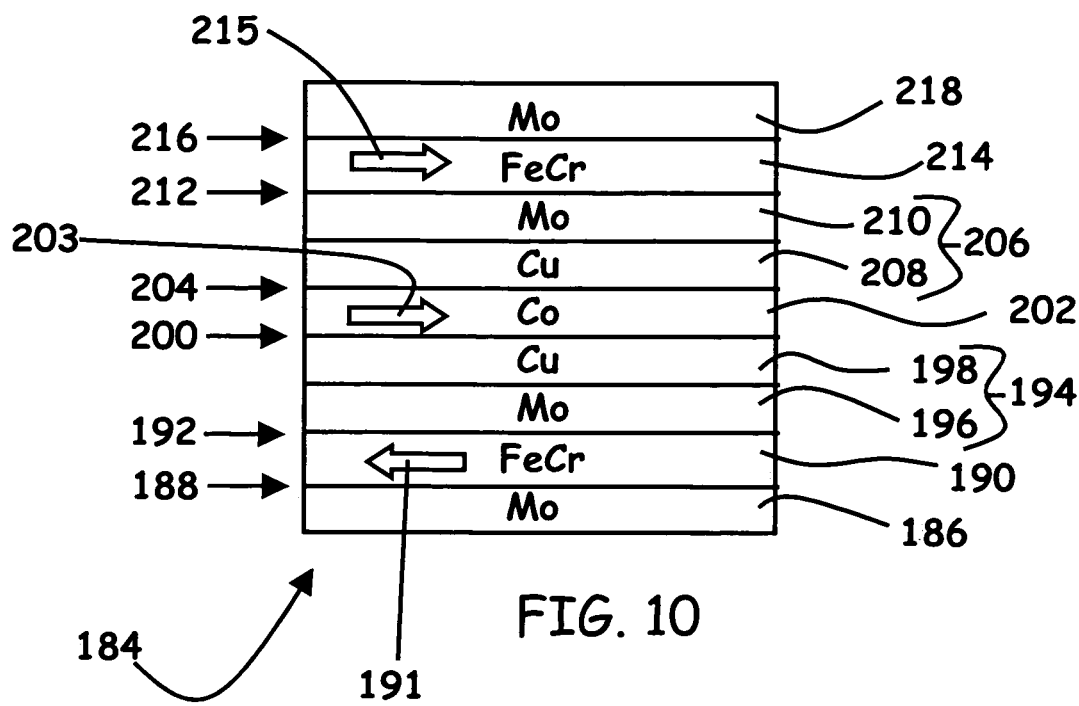
FIG. 10 is a cross-sectional view of a fifth embodiment of the SPEA magnet of the present invention.
Figure 11:
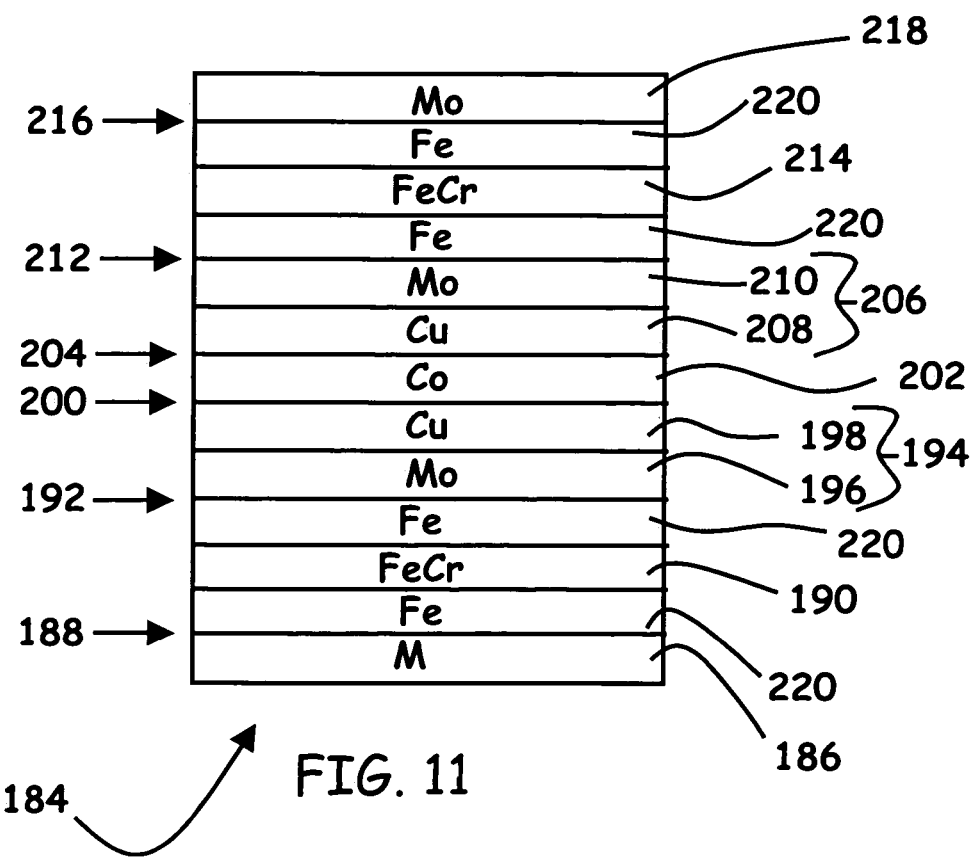
FIG. 11 is a cross-sectional view of a sixth embodiment of the SPEA magnet of the present invention.

FIGS. 10 and 11 illustrate additional embodiments of SPEA magnets consistent with the present invention. The following embodiments serve to illustrate a few of the many possible structural arrangements of the SPEA magnet. The SPEA magnet embodiments illustrated below, as well as those embodiments described above, may be applied in a variety of MR devices including, but not limited to: CIP, CPP, and TMR reader heads and MRAM.

FIG. 10 is a fourth embodiment of an SPEA magnet. SPEA magnet 184 includes an alternative arrangement of interface types: inverse—positive—inverse groupings of interfaces. Each group may include either one or two interfaces.

SPEA magnet 184 comprises: bottom spacer 186; first interface 188; first magnetic layer 190 with magnetization 191; second interface 192; first bi-layer spacer 194 formed of first layer 196 and second layer 198; third interface 200; second magnetic layer 202 with magnetization 203; fourth interface 204; second bi-layer spacer 206 formed of first layer 208 and a second layer 210; fifth interface 212; third magnetic layer 214 with magnetization 215; sixth interface 216; and top spacer 218.

First interface 188 is formed at the bottom of first magnetic layer 190 where it contacts bottom spacer 186. Second interface 192 is formed at the top of first magnetic layer 190 where it contacts first layer 196 of first bi-layer spacer 194. Third interface 200 is formed at the bottom of second magnetic layer 202 where it contacts second layer 198 of bi-layer spacer 194. Fourth interface 204 is formed at the top of second magnetic layer 202 where it contacts first layer 198 of second bi-layer spacer 196. Fifth interface 212 is formed at the bottom of third magnetic layer 214 where it contacts second layer 210 of second bi-layer spacer 206. The top of third magnetic layer 214 contacts top spacer 218 forming sixth interface 216.

Magnetization 191 of first magnetic layer 190 and magnetization 215 of third magnetic layer 214 preferably have a common orientation. Magnetization 203 of second magnetic layer 202 is oriented so as have at least a portion of magnetization 203 oriented antiferromagnetically from magnetization 191 of first magnetic layer 190 and magnetization 215 of third magnetic layer 214. Opposing magnetization 203 of second magnetic layer 202 allows for magnetostatic or RKKY coupling with first magnetic layer 190 and third magnetic layer 214 thereby stabilizing SPEA.

SPEA magnet 184 is illustrated in FIG. 10 with suggested materials to create alternating pairs of inverse—positive—inverse spin asymmetry interfaces. First interface 188, second interface 192, fifth interface 212 and sixth interface 216 are inverse spin asymmetry interfaces. Inverse spin asymmetry interfaces are created by forming first and third magnetic layers 190 and 214 of FeCr or other suitable material and adjacent spacer layers of Mo or other suitable material.

Centrally located between the pairs of inverse spin asymmetry interfaces are third and fourth interface 200 and 204 with positive spin asymmetry. Positive spin asymmetry interfaces are created by forming second magnetic layer 202 of Co or other suitable material, and forming adjacent spacer layers 198 and 208 of Cu.

SPEA magnet 184 may emphasize interfacial scattering by minimizing layer thickness to reduce bulk scattering by the magnetic layers. Alternatively, magnetic layer thickness may be increased to add bulk scattering to further enhance polarization in addition to the interfacial scattering already present. For example, first and third magnetic layers 190 and 214 of FeCr contribute bulk inverse spin asymmetry.

FIG. 11 illustrates an additional modification of SPEA magnet 184. Magnetic layers may be capped or otherwise layered with another magnetic material to alter the magnetic properties. In FIG. 11, first magnetic layer 190 and third magnetic layer 214 are capped both above and below by capping layers 220. Capping layers 220 are added to modify magnetic properties, for example permeability, and may be as thin as a few atoms. For example, first magnetic layer 190 and third magnetic layer 214 are formed of FeCr which is advantageously softened magnetically by adjacent capping layers of Fe.

To summarize, SPEA magnetic is a metallic artificial magnet comprising at least two ferromagnetic layers separated by a spacer formed of a plurality of non-magnetic layers thereby creating a plurality of interfaces for spin polarization enhancement. SPEA magnet includes both positive spin asymmetry and inverse spin asymmetry due to either interfacial or bulk scattering or both. Spin polarization is enhanced by antiferromagnetic arrangement of positive spin asymmetry and inverse spin asymmetry to select a single spin state.

Although the present invention has been described with reference to examples and preferred embodiments, workers skilled in the art will recognize that changes may be made in form and detail without departing from the spirit and scope of the invention.

The invention claimed is:

1. A magnet for enhanced spin polarization, the magnet comprising:
    a positive spin asymmetry interface; and
    an inverse spin asymmetry interface spaced from the positive spin asymmetry interface.

2. The magnet of claim 1 wherein a first magnetic layer adjacent the positive spin asymmetry interface has a first magnetization and a second magnetic layer adjacent the inverse spin asymmetry interface has a second magnetization and wherein at least a portion of the first magnetization is oriented antiferromagnetically from at least a portion of the second magnetization.

3. The magnet of claim 2 additionally comprising inverse spin asymmetry material adjacent the inverse spin asymmetry interface.

4. The magnet of claim 1 additionally comprising:
    a first magnetic layer;
    a first non-magnetic spacer layer;
    a second magnetic layer; and
    a second non-magnetic spacer layer;
    wherein the first magnetic layer contacts the first non-magnetic spacer to form the positive spin asymmetry interface; and
    wherein the second magnetic layer contacts the second non-magnetic spacer to form the inverse spin asymmetry interface.

5. The magnet of claim 4 wherein the first non-magnetic spacer layer is adjacent to the second non-magnetic spacer layer.

6. The magnet of claim 4 wherein the first magnetic layer has a first magnetization and the second magnetic layer has a second magnetization wherein at least a portion of the first magnetization is oriented antiferromagnetically from at least a portion of the second magnetization.

7. The magnet of claim 6 wherein first magnetic layer comprises material selected from the group consisting of: Co, Fe, NiFe, CoFe and NiCoFe.

8. The magnet of claim 7 wherein the first non-magnetic spacer layer comprises material selected from the group consisting of: Cu, Ag and Au.

9. The magnet of claim 6 wherein the second magnetic layer comprises material selected from the group consisting of: Fe, FeCr, NiCr, FeV, and FeCrV.

10. The magnet of claim 9 wherein the second non-magnetic spacer layer comprises material selected from the group consisting of: Mo, V and Cr.

11. The magnet of claim 6 wherein the second magnetic layer is formed of an inverse spin asymmetry material.

12. A magnetoresistive device having a magnetoresistive stack comprising:
    a first interface with inverse spin asymmetry;
    a second interface with positive spin asymmetry; and
    wherein a hi-layer spacer is sandwiched between the first interface and the second interface.

13. The magnetoresistive device of claim 12 additionally comprising:
    the first interface formed by a first magnetic layer with a first magnetization contacting a first layer of the hi-layer spacer;
    the second interface formed by a second magnetic layer with a second magnetization contacting a second layer of the hi-layer spacer; and
    wherein at least a portion of the first magnetization is oriented antiferromagnetically from at least a portion of the second magnetization.

14. The magnetoresistive device of claim 13 wherein the first magnetic layer has bulk inverse spin asymmetry.

15. The magnetoresistive device of claim 14 wherein the material for the first magnetic layer is selected from the group consisting of: FeCr, NiCr, FeV, and FeCrV.

16. The magnet of claim 15 wherein the first layer of the hi-layer spacer comprises material selected from the group consisting of: Mo, V and Cr.

17. The magnetoresistive device of claim 13 wherein the second magnetic layer has bulk positive spin asymmetry.

18. The magnet of claim 17 wherein second magnetic layer comprises material selected from the group consisting of: Co, Fe, NiFe, CoFe and NiCoFe.

19. The magnet of claim 18 wherein the second layer of the bi-layer spacer comprises Cu, Ag and Au.

20. The magnetoresistive device of claim 13 wherein the magnetoresistive device is selected from the group consisting of: a CIP transducing head, CPP transducing head, TMR transducing head and MRAM.

21. A magnetoresistive device having a magnetoresistive stack comprising:
a first magnetic layer comprising a bulk material with inverse spin asymmetry;
a second magnetic layer comprising a bulk material with positive spin asymmetry, wherein the second magnetic layer is spaced from the first magnetic layer.

22. The magnetoresistive device of claim 21 wherein the first magnetic layer has a first magnetization and the second magnetic layer has a second magnetization such that at least a portion of the first magnetization is oriented antiferromagnetically from at least a portion of the second magnetization.

23. The magnetoresistive device of claim 21 additionally comprising:
a spacer sandwiched between the first magnetic layer and the second magnetic layer, the spacer comprising:
a first spacer layer; and
a second spacer layer; and
wherein the first spacer layer contacts the first magnetic layer to form a first interface with inverse spin asymmetry.

24. The magnetoresistive device of claim 23 wherein the second spacer layer contacts the second magnetic layer to form a second interface with positive spin asymmetry.

25. The magnetoresistive device of claim 24 wherein the first magnetic layer has a first magnetization and the second magnetic layer has a second magnetization such that at least a portion of the first magnetization is oriented antiferromagnetically from at least a portion of the second magnetization.

26. A method of spin polarizing current comprising:
passing a first population of electrons through a positive spin asymmetry interface having a first magnetization resulting in a second population of electrons; and
passing the second population of electrons through a inverse spin asymmetry interface having a second magnetization oriented antiferromagnetically relative to the first magnetization resulting in a third population of electrons;
wherein the polarization of the second population of electrons is greater than the first population of electrons and the polarization of the third population is greater than the polarization of the second population.

27. A read sensor for a transducing head comprising:
a magnetoresistive stack including a spin polarization enhancement magnet; and
a hard bias element adjacent to the magnetoresistive stack.

28. The read sensor of claim 27 wherein the spin polarization enhancement magnet comprises:
a plurality of ferromagnetic layers spaced with bi-layer spacers wherein each ferromagnetic layer has magnetism such that the magnetism of alternating ferromagnetic layers are oriented antiferromagnetically;
a positive spin asymmetry interface; and
an inverse spin asymmetry interface.

29. The read sensor of claim 27 wherein the spin polarization enhancement magnet comprises:
a first ferromagnetic layer;
a first spacer layer adjacent to the first ferromagnetic layer;
a second spacer layer adjacent to the first spacer layer;
a second ferromagnetic layer adjacent to the second spacer layer;
a third spacer layer adjacent to the second ferromagnetic layer;
a fourth spacer layer adjacent to the third spacer layer;
a third ferromagnetic layer adjacent to the fourth spacer layer; and
wherein the first ferromagnetic layer and the third ferromagnetic layer each have a magnetization aligned in a first direction and the second ferromagnetic layer has a magnetization aligned in a second direction, the second direction being opposite the first direction.

30. The read sensor of claim 29 wherein a fifth spacer layer is adjacent to the third ferromagnetic layer and a seed layer is adjacent to the fifth spacer layer.

31. The read sensor of claim 29 wherein a sixth spacer layer is adjacent to the first ferromagnetic layer.

32. The read sensor of claim 29 wherein the second ferromagnetic layer comprises a material to form a first inverse spin asymmetry interface with second spacer layer and to form a second inverse spin asymmetry interface with third spacer layer.

33. The read sensor of claim 32 wherein the second ferromagnetic layer comprises material selected from the group consisting of: Fe, FeCr, NiCr, FeV, FeMo and FeCrV.

34. The read sensor of claim 32 wherein the second spacer layer and the third spacer layer comprise material selected from the group consisting of: Mo, V and Cr.

35. The read sensor of claim 32 wherein the first and third ferromagnetic layers comprise material selected from the group consisting of: Co, Fe, NiFe, CoFe and NiCoFe.

36. The read sensor of claim 35 wherein the first spacer layer and the fourth spacer layer comprise material selected from the group consisting of: Cu, Ag and Au.

37. The read sensor of claim 27 wherein the magnetoresistive stack additionally comprises:
a free layer; and
a barrier separating the spin polarization enhancement magnet from the free layer.

38. A magnet for enhanced spin polarization comprising:
a first magnetic layer;
a second magnetic layer antiferromagnetically oriented with respect to the first magnetic layer;
a positive spin asymmetry interface adjacent the first magnetic layer; and
an inverse spin asymmetry interface adjacent the second magnetic layer.

39. The magnet for enhanced spin polarization of claim 38 wherein the second magnetic layer is formed of a magnetic material with bulk inverse spin asymmetry.

40. The magnet for enhanced spin polarization of claim 38 additionally comprising:
a third magnetic layer antiferromagnetically oriented with respect to the second magnetic layer; and
a second positive spin asymmetry interface adjacent the third magnetic layer.

* * * * *

UNITED STATES PATENT AND TRADEMARK OFFICE
CERTIFICATE OF CORRECTION

PATENT NO. : 7,099,122 B2  
APPLICATION NO. : 10/737579  
DATED : August 29, 2006  
INVENTOR(S) : Ge Yi et al.

It is certified that error appears in the above-identified patent and that said Letters Patent is hereby corrected as shown below:

Column 2, Page 2, Line 5, delete "Apr. 15, pp.", insert --Apr. 15, 1999, pp.--

Column 9, Line 34, delete "450", insert -- 45° --

Column 11, Line 3, delete "layer – rain", insert --layer – drain --

Column 11, Line 21, delete "positive-verse-positive", insert --positive--inverse--positive--

Column 14, Line 45, delete "hi-layer", insert --bi-layer--

Column 14, Line 50-5, delete "hi-layer", insert--bi-layer--

Column 14, Line 54, delete "hi-layer", insert --bi-layer--

Column 14, Line 64, delete "hi-layer", insert --bi-layer--

Signed and Sealed this

Nineteenth Day of June, 2007

JON W. DUDAS  
*Director of the United States Patent and Trademark Office*